July 8, 1969
R. GILMONT ET AL
3,453,890
VACUUM GAUGE ASSEMBLY
Filed Aug. 19, 1963
Sheet 1 of 2
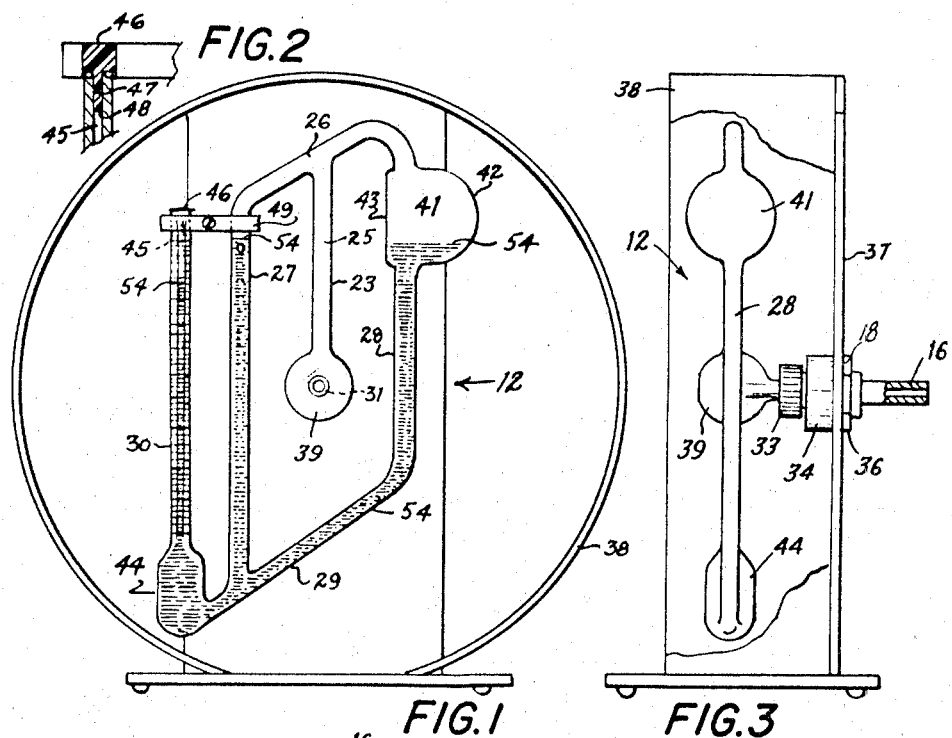
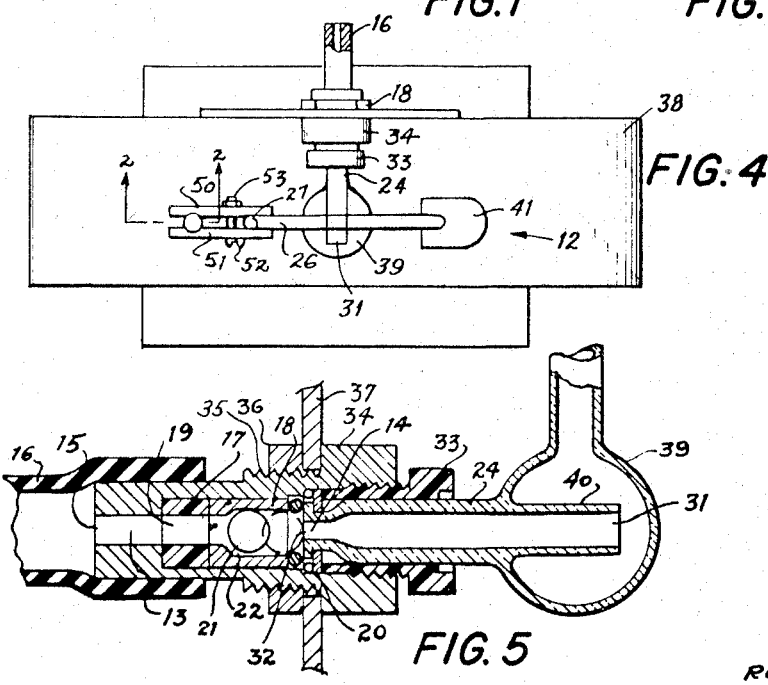
INVENTORS.
ROGER GILMONT
MARTIN C. PARKINSON
BY  J. Walton Bader
ATTORNEY

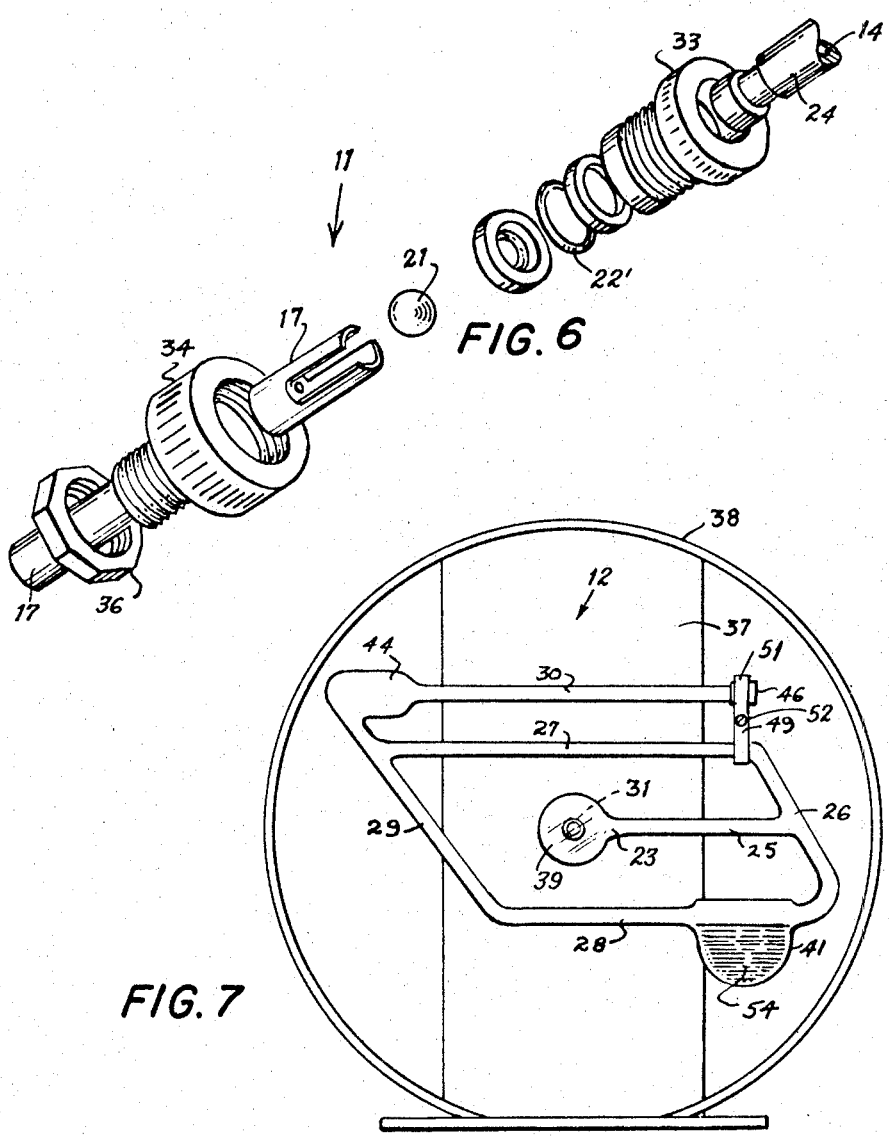

United States Patent Office

3,453,890
Patented July 8, 1969

3,453,890
VACUUM GAUGE ASSEMBLY
Roger Gilmont, Douglaston, and Martin C. Parkinson, Hyde Park, N.Y., assignors to The Vir-Tis Company, Inc., Gardiner, N.Y., a corporation of New York
Filed Aug. 19, 1963, Ser. No. 303,061
Int. Cl. G01l 21/04
U.S. Cl. 73—400            5 Claims

ABSTRACT OF THE DISCLOSURE

A vacuum gauge assembly of the McLeod type has a graduated measuring capillary provided with a plug at its free end. The plug is cut off square for greatest accuracy in measuring, and a clamping means holds the plug in place while providing mechanical support to the measuring capillary. A one-way check valve is provided at the inlet end of the gauge to preclude the inrush of air with its adverse effects should the vacuum be lost.

---

This invention relates to a vacuum gauge assembly having a number of novel features. These features all co-operate to produce a vacuum gauge assembly of the McLeod type which is considerably superior to those heretofore made. However a number of the individual features also have separate utilization and therefore are separately claimed.

In vacuum gauge assemblies of the type set forth in the instant invention circumstances occur in operation wherein the vacuum producing means which are connected to the assembly are rendered inoperative and atmospheric air rushes into the mechanism. When this occurs in the conventional assembly a surge of air pressure enters the device. This causes violent fluctuations in the mercury level and can cause breakage of the parts.

Furthermore, in the conventional device, the arm containing the indicating graduations is permanently closed at its upper portion. In use dirt and other impurities enter the device and discolor the interior of the arm. Because of the construction thereof, in the conventional apparatus, there is no simple and effective way to clean the device. Hence after a protracted period of use, the device becomes inoperative requiring costly replacement. In the instant apparatus the arm containing the indicating graduations is open at its upper portion and a cap is removably disposed in the opening. Hence cleaning of the device is quite simple, being done by removal of the cap and insertion of conventional cleaning brushes.

Furthermore, in the preferred modification of this invention, the cap contains a projecting stem portion which extends into the opening at the top of the said arm. The stem portion, which is preferably of the same diameter as that of the opening into which it extends, has a flat lower portion so that extremely accurate pressure measurements can be made.

Also, in some conventional devices of the type involved herein, the supply bowl containing the mercury or other indicating fluid is of conventional rounded construction both on the top and the bottom. When the conventional device is moved to its initial position for commencement of the reading operation a clear air flow is not produced so that inaccuracies of reading and possible splashing of fluid occur. In the device of this invention the supply bowl contains a flat upper portion so that this difficulty is obviated and air flow is directed above and parallel to the surface of the liquid.

The foregoing constitutes a brief description of the instant invention and the advantages thereof. The invention will now be further described by reference to the accompanying drawings which are made a part of this specification.

FIG. 1 is a front elevational view of a vacuum indicating mechanism made in accordance with this invention with the device in the position that it normally assumes when a reading of vacuum is being taken.

FIG. 2 is a detail cross-sectional view on an enlarged scale showing the cap member and associated clamp means in position within the opening provided at the top of the indicating arm taken along lines 2—2 of FIG. 1.

FIG. 3 is a side elevational view, partly in section, of the device shown in FIG. 1.

FIG. 4 is a plan view of the device shown in FIGS. 1 and 3.

FIG. 5 is a detail cross-sectional view, on an enlarged scale, of the valve mechanism utilized in the device of the instant invention and associated parts showing the valve mechanism in its normal position when the instant invention is operative. The position of the valve mechanism when the vacuum producing means are rendered inoperative is shown in phantom lines.

FIG. 6 is an exploded perspective view of the components of the valve mechanism of FIG. 5.

FIG. 7 is a front elevational view of the device shown in FIG. 1 but showing the position of the vacuum indicating mechanism in its initial condition.

The invention will now be further described by reference to the specific forms thereof shown in the accompanying drawings. However the reader is cautioned to note that these specific forms and modifications, which represent the best modes known to the applicants of taking advantage of their invention, are for specific illustration and for purposes of example only. Various changes and modifications may obviously be made within the spirit and scope of this invention and would occur to those skilled in this art.

The vacuum gauge assembly of the instant invention is divided into two basic parts which are the valve mechanism 11 and the vacuum indicating mechanism 12. The valve mechanism 11 is formed with a conduit 13 which contains first inlet opening 14 and first outlet opening 15. First outlet opening 15 is connected to a tubular member 16 through the sleeve 17 and conduit 13 is connected to a vacuum producing mechanism such as a vacuum pump (not shown).

The sleeve 17 is disposed within conduit 13 and is provided with second inlet opening 18 and second outlet opening 19. The inlet opening of the sleeve 17 is enlarged as at 22 and opens toward a seat 20. A ball 21 of larger diameter than the opening 19 is positioned within seat 20 is movable within enlarged portion 22 of sleeve 17 and is engageable with an O-ring 22′. The O-ring 22′ also functions to seal the end of the sleeve 18 to the end 32 of the inlet 14.

Vacuum indicating mechanism 12 is formed with a continuous hollow body 23 having a stem portion 24 and integral first, second, third, fourth, fifth and sixth arms 25, 26, 27, 28, 29 and 30 which form a closed circuit. The sixth arm 30 is provided with graduations to form a measuring capillary. Stem portion 24 is formed with an inlet opening 31 and an outlet opening 32. Threaded member 33 is disposed abut stem portion 24 and is threadedly connected to socket member 34. Socket member 34 bears a threaded extension 35 which in turn is connected to nut 36.

A support 37 is secured into position as indicated in FIG. 3. Support 37 bears a circumferential a guard portion 38 so as to shield the gauge against contact by foreign objects which could damage the vacuum indicating mechanism.

The central or inlet arm 25 is provided at its lower end with a first bowl portion 39 into which projects the end portion 40 of stem 24. The opposite or upper end of the central arm 25 is connected to the transverse arm 26 at an intermediate portion thereof. The transverse arm is integral with the upper ends of arms 27 and 28. A second bowl portion 41 is connected to an intermediate portion of an arm 28. The bowl 41 is provided with a rounded portion 42 and a flat portion 43.

The opposite end of the arm 28 is integral with an end of transverse arm 29 and the opposite end portion of upper arm 27 is connected to an intermediate portion of arm 29. The measuring capillary 30 is provided with a third bowl portion 44 at an end portion integral an end portion of arm 29. The opposite end portion of measuring capillary 30 is formed with an opening 45. A cap 46 having a projecting stem portion 47 terminating in a flat bottom 48 into the opening 45 with the cap 46 being secured in position by clamp 49. The clamp 49 includes a pair of interlocking plates 50 and 51 extending between the measuring capillary 30 and arm 27. The plates 50 and 51 are joined by screw 52 and nut 53 to clamp the plug 46 and measuring capillary 30 to the arm 29.

The level of vacuum is indicated by fluid 54 which is disposed within body 23 of the gauge. In the preferred modification of this invention the fluid utilized is mercury.

With the foregoing specific description of this inventon the operation thereof may now be explained.

After the vacuum gauge assembly is connected to vacuum producing means through junction member 16 body 23 is rotated within support 37 to assume the position shown in FIG. 7. It is noted that, in this position, fluid 54 is disposed entirely within bowl 41 so that continuous exhaustion of air is permitted. All the fluid 54 is located in the bowl 41. The air flow does not disturb the surface of the liquid as it is parallel thereto. After the vacuum has been stabilized so that a reading is desired body 23 is rotated about support 37 to assume the position shown in FIG. 1. At this point fluid 54 assumes the position shown in FIG. 1 and attains the height which is dependent upon the residual air which is trapped within body 23.

If, during the operation of the instant invention, the vacuum producing means should temporarily become inoperative so that atmospheric air would normally rush into the interior of body 23, ball 22 becomes operative. The influx of atmospheric air through first outlet opening 15 will push the glass ball 22 against seat 20, as shown in phantom lines in FIG. 5, and thus will prevent any influx of atmospheric air into stem 24 and thus into the interior of body 23. If the vacuum producing means are thereafter actuated and the break in the system repaired, ball 22 will then move away from seat 20 to the position shown in solid lines and will permit proper functioning of the device.

If the interior of arm 30 becomes dirty after a period of operation of vacuum indicating mechanism 12 the operator need only remove clamp 49 from arm 30 and then remove cap 46 from opening 45. A conventional cleaning brush can now be inserted into opening 45 and the device cleaned. In performing this operation the glass portion of the gauge 12 is preferably removed from the holder, the mercury emptied and the gauge or measuring capillary cleaned with a brush or conventional pipe cleaner. A fresh charge of mercury can be poured into the guage after replacement of the cap 46 and the gauge mounted as indicated in FIG. 1.

Because of the accurately flattened bottom 48 of stem 47 (which flatness cannot be produced by conventional glass-forming techniques) an extremely accurate reading of the vacuum produced can be obtained.

The preferred material of which body 23 is made is glass; the preferred indicating fluid is mercury; cap 46 and stem 47 are preferably made of rubber, plastic or other resilient materials; the components of the valve mechanism can be any suitable material adapted for the purpose which is well known to those skilled in this art.

The foregoing specific description indicates the manner in which the objects of this invention are achieved.

We claim:

1. A vacuum gauge assembly comprising a conduit having first inlet and outlet openings, a sleeve portion within said conduit having second inlet and outlet openings, a seat within said second inlet opening, a ball movable within said sleeve portion of said conduit having a larger diameter than said seat, vacuum producing means operatively connected with said first outlet opening, said ball being movable against said seat when said vacuum producing means is inoperative; a vacuum indicating mechanism formed with a rotatable continuous hollow body provided with a third outlet opening therewithin connected to the first inlet opening of said conduit, an indicating liquid within said body, scale means upon said body showing the level of said indicating liquid, said body having integral first, second, third, fourth, fifth and sixth arms thereupon each having opposite end portions, said first arm connected to said third outlet opening at one end thereof and extending outwardly therefrom, said second arm angularly connected at an intermediate portion to the opposite end of said first arm, said third and fourth arms angularly connected at one end thereof to opposite ends of said second arm, said third arm also angularly connected to an intermediate portion of said fifth arm; a bowl portion within said fourth arm intermediate its ends having a substantially flat upper portion, said fifth arm also angularly connected at one end thereof to the opposite end of said fourth arm and angularly connected at its opposite end to one end of said sixth arm, said sixth arm provided with an opening at its opposite end, a cap removably disposed about said opening within said sixth arm, said cap having an enlarged head portion and a projecting stem portion extending into said opening, and means securing said cap about said opening.

2. A vacuum gauge assembly comprising a conduit having first inlet and outlet openings, a sleeve within said conduit having second inlet and outlet openings and an enlarged portion adjacent said second inlet opening, a seat within said second inlet opening, a ball movable within the enlarged portion of said sleeve having a larger diameter than said seat, vacuum producing means operatively connected with said first outlet opening, said ball being movable against said seat when said vacuum producing means are inoperative; a vacuum indicating mechanism formed with a rotatable continuous hollow body, an indicating liquid within said body, a scale upon said body showing the level of said indicating liquid, said body also having a stem portion and integral first, second, third, fourth, fifth and sixth arms thereupon each having opposite end portions, one end portion of said stem member operatively connected to the first inlet opening of said conduit, said first arm having a first bowl portion adjacent said end portion of said stem, the opposite end portion of said stem extending into said first bowl, said second arm angularly connected at an intermediate portion to the opposite end of said first arm, said third and fourth arms angularly connected at one end thereof to opposite ends of said second arm, said third arm also angularly connected to an intermediate portion of said fifth arm, a second bowl portion within said fourth arm intermediate its ends having a substantially flat upper portion, said fifth arm also angularly connected at one end thereof to the opposite end of said fourth arm and in turn angularly connected at its opposite end to one end of said sixth arm, said sixth arm having a third bowl portion adjacent said connected end and provided with an opening at its opposite end, a cap removably disposed about said opening within said sixth arm, said cap having an enlarged head portion and a projecting stem portion having a flat bottom thereupon extending into said opening, and a clip member disposed about said head portion of said cap and the adjacent portion of said sixth arm, said clip also extending adjacent said third arm and securing said cap in position.

3. In a vacuum gauge assembly of the McLeod type having a reservoir filled with mercury or the like, a measuring capillary tube having one end in communication with said reservoir portion, the opposite end of said measuring capillary tube being closed off against communication with the ambient, conduit means having one end thereof communicating with said reservoir and check valve means at the opposite end of said conduit means, said check valve means being adapted to join said conduit means to a source of vacuum while permitting rotation of said gauge from a generally vertical position to a generally horizontal position, and said check valve means being operative to cut off communication with said conduit means when the pressure externally of said gauge is greater than the pressure internally of said gauge thereby preventing an inrush of air into said reservoir and measuring capillary tube on breaking of the vacuum.

4. In a vacuum gauge assembly of McLeod type, said vacuum gauge including an inlet portion adapted for connection to a source of vacuum, a measuring capillary tube having one end thereof in communication with said inlet portion through a pair of generally parallel arms, said arms having opposite ends thereof joined by transversely extending arms, said measuring capillary having a free standing end portion positioned for unobstructed longitudinal access thereto along the axis thereof, said free standing end having an opening at a terminal part thereof and a removable plug means having a flat end thereon, said flat end of said plug means being disposed in said opening in said free standing end portion of said measuring capillary tube to provide greater accuracy in measurement of vacuum, said plug being removable to permit controlled access to said measuring capillary tube for periodic cleaning thereof.

5. The vacuum gauge assembly of claim 4 including clamping means to join said free standing end of said measuring capillary tube and one of said arms to provide mechanical support for said free standing end and clamp said plug means in said opening.

References Cited

UNITED STATES PATENTS

| | | | |
|---|---|---|---|
| 2,572,383 | 10/1951 | Porter | 215—82 |
| 2,583,460 | 1/1952 | Zepelovitch | 215—82 |
| 2,278,195 | 3/1942 | Flasdorf et al. | 73—400 |
| 2,608,096 | 8/1952 | Lippincott | 73—400 |
| 2,899,974 | 8/1959 | Gratzmuller | 137—533 |
| 3,105,516 | 10/1963 | Werra et al. | 137—533 |

LOUIS R. PRINCE, *Primary Examiner.*

DONALD O. WOODIEL, *Assistant Examiner.*